(12) United States Patent
Wang

(10) Patent No.: US 7,298,444 B2
(45) Date of Patent: Nov. 20, 2007

(54) REFLECTION TYPE LIQUID CRYSTAL DISPLAY

(75) Inventor: Chaung-Chi Wang, Miaoli Hsien (TW)

(73) Assignee: TPO Displays Corp., Chu-Nan (TW)

( * ) Notice: Subject to any disclaimer, the term of this patent is extended or adjusted under 35 U.S.C. 154(b) by 46 days.

(21) Appl. No.: 10/809,353

(22) Filed: Mar. 26, 2004

(65) Prior Publication Data
US 2004/0189898 A1 Sep. 30, 2004

(30) Foreign Application Priority Data
Mar. 28, 2003 (TW) ............... 92107168 A

(51) Int. Cl.
*G02F 1/1343* (2006.01)
*G02F 1/1335* (2006.01)
*G02F 1/13* (2006.01)
(52) U.S. Cl. ............ 349/139; 349/113; 349/197
(58) Field of Classification Search ........... 349/113, 349/139, 197
See application file for complete search history.

(56) References Cited
U.S. PATENT DOCUMENTS
5,986,729 A * 11/1999 Yamanaka et al. ............ 349/79
6,783,874 B2 * 8/2004 Hasegawa et al. ......... 428/811.2
6,853,421 B2 * 2/2005 Sakamoto et al. .......... 349/114
2002/0130987 A1 9/2002 Rajeswaran et al.
2003/0071931 A1 4/2003 Nakayoshi et al.
2003/0234899 A1 12/2003 Kawata
2005/0213024 A1 * 9/2005 Wang ..................... 349/197

FOREIGN PATENT DOCUMENTS
WO      03044763      5/2003

\* cited by examiner

*Primary Examiner*—Dung T. Nguyen
(74) *Attorney, Agent, or Firm*—Liu & Liu

(57) ABSTRACT

A reflective liquid crystal display disclosed herein includes a transistor substrate, a color filter substrate, a first lower electrode, a first upper electrode, a first transparent insulator, a second transparent insulator, a second lower electrode, a second upper electrode and a liquid crystal layer. The first lower electrode, the first transparent insulator and the second lower electrode are formed sequentially on the top surface of the transistor substrate. The first upper electrode, the second transparent insulator and the second upper electrode are fabricated sequentially on the bottom surface of the color filter substrate. The liquid crystal layer is sandwiched between the second lower electrode and the second upper electrode. One of the first lower electrode and the second lower electrode is electrically connected to a plurality of transistors and reflects the external light.

26 Claims, 4 Drawing Sheets

| comparison \ matrix mode | AMLCD | PMLCD |
|---|---|---|
| contrast ratio | higher | lower |
| resolution | more | less |
| electric consumption | more | less |
| manufacturability | complex | simple |

REFLECTION TYPE LIQUID CRYSTAL DISPLAY

FIELD OF THE INVENTION

The present invention relates to a reflection type liquid crystal display (LCD) and, more particularly, to a reflection type LCD having two matrix modes converged within a panel.

BACKGROUND OF THE INVENTION

Since the explosive growth in wireless communications is a worldwide phenomenon, the next generation of mobile phones, also known as 3G (third generation) or UMTS (Universal Mobile Telecommunication Services), is a technology that allows users to access e-mails, videos and webs via a mobile phone.

Many companies, such as Motorola and Samsung, have provided 3G mobile phones that possess two displays. These kinds of mobile phones offer people two viewing options. A large interior display is used for standard functions and an exterior one just shows a caller's ID or, time and date. According to this, the resolution of the interior display is much higher than the exterior one. The interior display with higher resolution is sometimes an active matrix liquid crystal display (AMLCD). The exterior display with less electrical consumption can be a passive matrix LCD (PMLCD).

A liquid crystal (LC) layer of the PMLCD is sandwiched between two glass substrates, which contain parallel sets of electrical lines (electrodes) in a row and column configuration to form a matrix. Every intersection is a pixel. When applying a voltage high enough across the pixel, the LC molecules are aligned to determine the gray scale of the pixel.

AMLCD is similar to the PMLCD. However, AMLCD further includes an electronic switch (e.g. thin film transistor; TFT) at every pixel so as to provide faster switching. The addressing mechanism eliminates problems of the viewing angle and the brightness suffered by the PMLCD.

Referring to FIG. 1, a simple comparison between the AMLCD and PMLCD is shown. The electrical consumption is much less in PMLCD than in AMLCD. The resolution and contrast ratio, however, are higher in AMLCD than in PMLCD. The manufacturability of the AMLCD is more complex than that of the PMLCD.

In order to reduce the weight and thickness of the mobile phone that has two distinct LCDs, it's beneficial to converge the active and the passive matrix modes within one LCD panel.

A reflection type liquid crystal display includes a reflective plate, that reflects the external light which enters into the liquid crystal display. The reflected external light is used as a light source of the reflection type liquid crystal display. Hence, a backlight module serving as a light source is therefore unnecessary. For this reason, the reflection type liquid crystal display is generally adopted as a display in a portable terminal device such as a mobile phone. In brief, the reflection type liquid crystal display is superior to a transmission type liquid crystal display with respect to power consumption, thickness, and weight etc.

BRIEF SUMMARY OF THE INVENTION

Accordingly, an object of the present invention is to provide a reflection type liquid crystal display having at least two matrix modes converged within a panel.

Another object of the present invention is to provide a reflection type liquid crystal display having at least two matrix modes converged within a panel, wherein at least one matrix mode thereof comprises an active matrix mode.

A reflection type liquid crystal display comprising a lower transparent substrate, a first transparent insulating layer, a reflective layer, a second transparent insulating layer, an upper transparent substrate, a first set of electrodes, a third transparent insulating layer, a fourth transparent insulating layer, a second set of electrodes, a first transparent alignment film, a second transparent alignment film and a liquid crystal layer is disclosed herein. On the first transparent substrate are fabricated a plurality of thin film transistors (TFT), and on the second transparent substrate is attached a color filter. The first transparent insulating layer, the reflective layer and the second transparent insulating layer are formed in turn on the lower transparent substrate, wherein the first transparent insulating layer is served to cover the transistors and to provide insulation and planarization. The first set of electrodes comprises a first lower electrode on the second transparent insulating layer and a first upper electrode on the color filter. The third and the fourth transparent insulating layers are formed on the first lower electrode and the first upper electrode respectively. The second set of electrodes comprises a second lower electrode on the third transparent insulating layer and a second upper electrode on the fourth transparent insulating layer. One of the first set of electrodes and the second set of electrodes is in active matrix mode. The first transparent alignment film is formed on the second lower electrode, whereas the second transparent alignment film is fabricated on second upper electrode. The liquid crystal layer is sandwiched between the first and the second alignment films. The reflective layer is used to reflect and diffuse the incident light from the upper transparent substrate.

BRIEF DESCRIPTION OF THE INVENTION

The foregoing aspects and many of the attendant advantages of this invention will become more readily appreciated and understood by referencing the following detailed description in conjunction with the accompanying drawings, wherein.

DETAILED DESCRIPTION OF THE INVENTION

The invention disclosed herein is directed to a reflection type liquid crystal display (LCD) having at least two matrix modes converged within a panel, wherein one of the two matrix modes is an active matrix mode. When the reflection type liquid crystal display LCD is applied to a portable terminal device, the different demand for displays can be satisfied by switching between different matrix modes. For example, the passive matrix mode is activated to address the image formation satisfying the demand of lower resolution and slower switching, whereas the active matrix mode is activated satisfying the demand of higher resolution and faster switching. Hence, the different demand of users can be easily satisfied and the electrical consumption of the portable terminal device can be effectively saved. The embodiments of the present invention are now described in detail below.

EMBODIMENT 1

Figures 1, 2A:
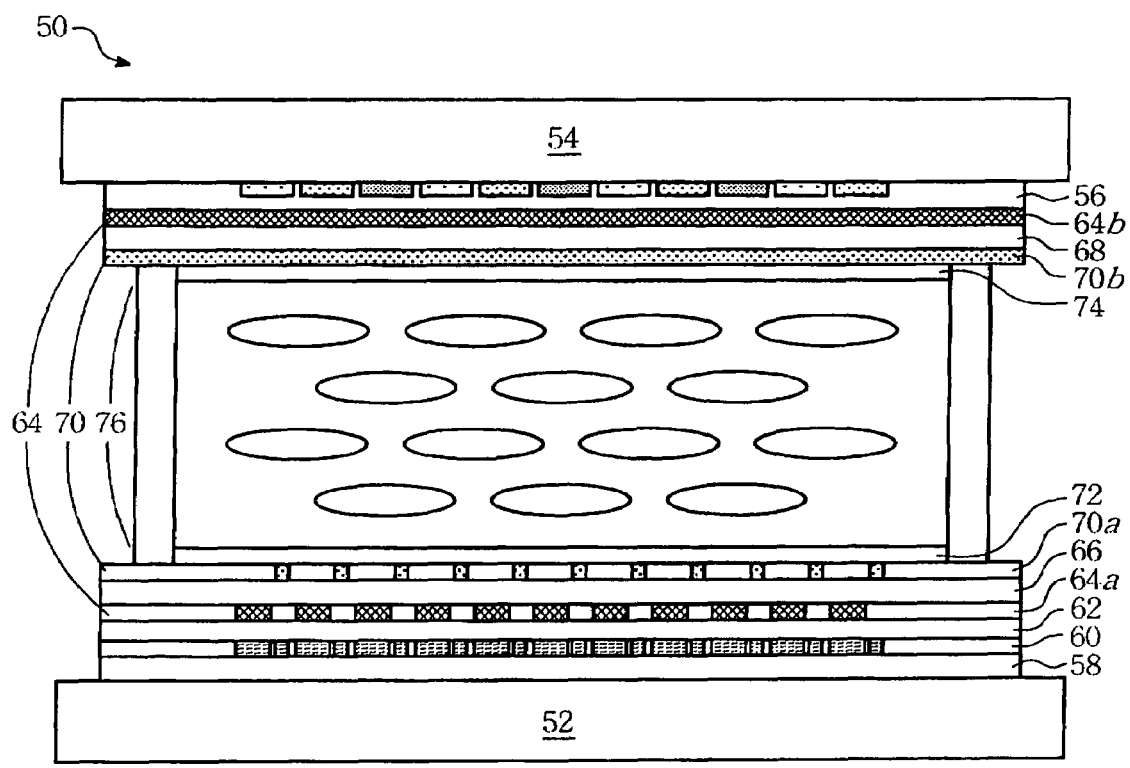
FIG. 1 shows a simple comparison between the AMLCD and PMLCD.
FIG. 2(A) is a cross-sectional view of a reflection type liquid crystal display in accordance with the present invention.

Referring to FIG. 2(A), the reflection type LCD 50 comprises a lower transparent substrate 52, an upper transparent substrate 54, a color filter 56, a first transparent insulating layer 58, a reflective layer 60, a second transparent insulating layer 62, first lower and upper electrodes 64a·64b, a third transparent insulating layer 66, a fourth transparent insulating layer 68, second lower and upper electrodes 70a·70b, a first transparent alignment film 72, a second transparent alignment film 74 and a liquid crystal layer 76. A plurality of thin film transistors (TFTs) (not shown) and a color filter 56 are fabricated on the opposing inner surfaces of the lower and upper transparent substrate 52 and 54 respectively made of glass or plastics, wherein the TFTs are served as electronic switches. The first transparent insulating layer 58 is formed on the lower transparent substrate 52 to cover the TFTs and to provide insulation and planarization.

Figure 3:
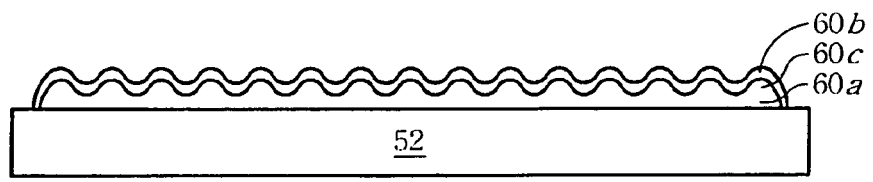
FIG. 3 is cross-sectional view of the reflection type liquid crystal display, illustrating a reflective layer made over the lower transparent substrate in accordance with the present invention.

The reflective layer 60 is formed on the first transparent insulating layer 58. Now referring to FIG. 3, the reflective layer 60 comprises an insulator 60a and a reflector 60b. On the upper surface of the insulator 60a have a plurality of bumps 60c. Because of the bumps 60c on the insulator 60a, the reflector 60b formed on the insulator 60a will have an uneven surface.

Referring back to FIG. 2(A), the second transparent insulating layer 62 is formed on the reflective layer 60. The first set of electrodes 64 includes a first lower electrode 64a and a first upper electrode 64b, wherein the first lower electrode 64a is fabricated on the second transparent insulating layer 62. In an embodiment of the present invention, the material of the first lower electrode 64a is indium tin oxide (ITO), a conductor with high transparence. The first upper electrode 64b is formed on the aforesaid color filter 56. As just mentioned, the first upper electrode 64b preferably comprises ITO. Upon the first lower electrode 64a and the first upper electrode 64b are formed respectively the third transparent insulating layer 66 and fourth transparent insulating layer 68.

Still referring back to FIG. 2(A), the second set of electrodes 70 comprises a second lower electrode 70a and second upper electrode 70b. The second lower electrode 70a is formed on the third transparent insulating layer 66, whereas the second upper electrode 70b is formed on the fourth transparent insulating layer 68. In an embodiment of the present invention, the second lower electrode 70a and second upper electrode 70b are made of ITO. The first transparent alignment film 72 and the second transparent alignment film 74 are formed on the second lower electrode 70a and the second upper electrode 70b, respectively. The liquid crystal layer 76 is sandwiched between the first and the second transparent alignment films 72 and 74.

While the first set of electrodes 64 set is activated optionally to address the liquid crystal molecules to twist, a voltage of the first lower electrode 64a will be influenced by the second lower electrode 70a since both of them are made of conductive materials. For example, when applying 5 volts to the first lower electrode 64a, the second lower electrode 70a over the first lower electrode 64a will be induced approximately to have a parasitic voltage of 1 volt. Thus, the developing image addressed by the first lower electrode 64a will be influenced by the second lower electrode 70a.

In order to solve the problem described above, dispositions of the first lower electrode 64a and the second lower electrode 70a are preferably staggered.

Figure 2B:
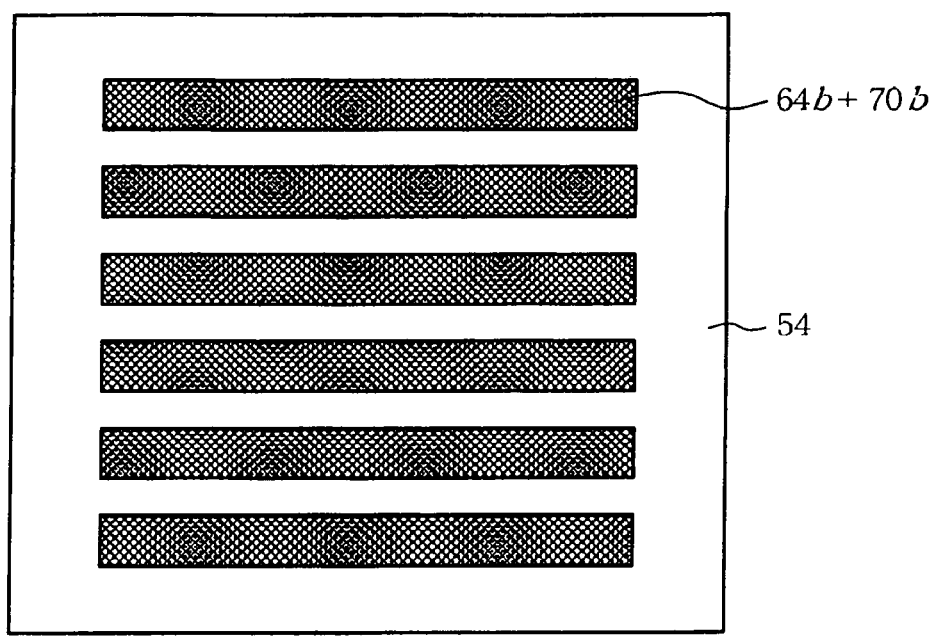
FIG. 2(B) is a top plan view, illustrating a configuration of a first upper electrode and a second upper electrode on an upper transparent substrate in accordance with the present invention.
Figure 2C:
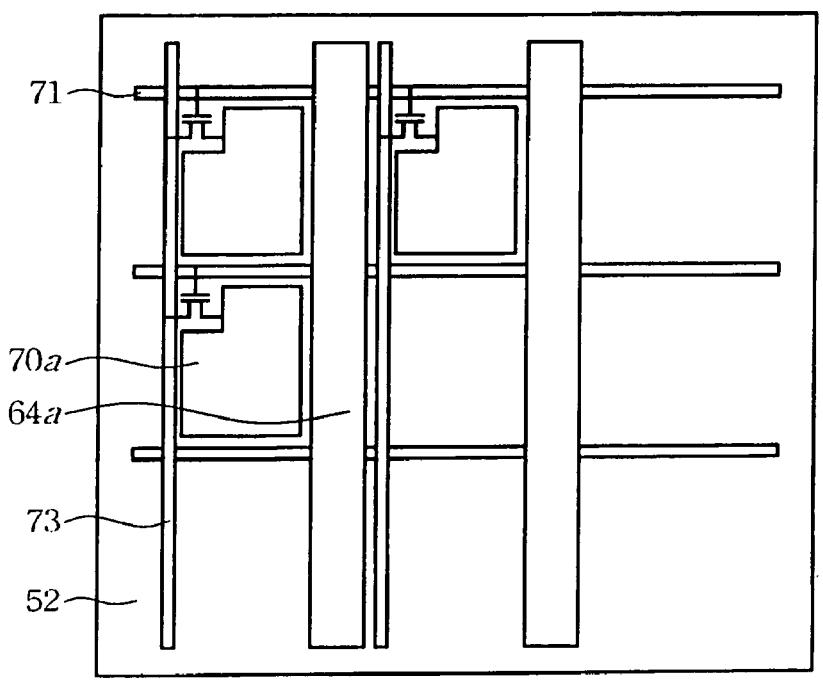
FIG. 2(C) is a top plan view, illustrating a configuration of a first lower electrode and a second lower electrode on a lower transparent substrate in accordance with the present invention.

Referring to FIGS. 2(B) and 2(C), the FIG. 2(B) is a top plan view illustrating a configuration of the first upper electrode 64b and the second upper electrode 70b on the upper transparent substrate 54, whereas the FIG. 2(C) shows a top plan view illustrating a configuration of the first lower electrode 64a, the second lower electrode 70a, a plurality of scan lines 71 and signal lines 73 (not shown in FIG. 2(A)) on the lower transparent substrate 52. As shown in FIG. 2(C), the first lower electrode 64a and the second lower electrode 70a fabricated over the lower transparent substrate 52 are staggered to prevent an undesired electric interference occurred between two conductive layers.

The first upper electrode 64b shown in FIG. 2(B) comprises parallel sets of column electrodes, and the first lower electrode 64a shown in FIG. 2(C) comprises parallel sets of row electrodes. The row and column configuration forms a matrix. When applying two respective voltages to a column electrode and a row electrode, alignments of the liquid crystal molecules are altered by a potential difference produced at an intersection between the row and column electrodes (i.e. a pixel). As shown in the figure, the second lower electrode 70a is electrically connected to drains of the TFTs. Source and gates of the TFTs are in contact with the signal lines 73 and the scan lines 71, respectively. While the TFTs are turned on, alignments of the liquid crystal molecules are altered by a potential difference produced between the second lower electrode 70a and the second upper electrode 70b.

Another way to prevent the undesired electric interference is supplying a 1 volt of negative voltage to the second lower electrode 70a at time of applying 5 volts of positive voltage to the first lower electrode 64a such that the parasitic voltage of 1 volt positive induced at the second lower electrode 70a can be neutralized. Hence, the accuracy of the image development is effectively improved.

One of the first lower electrode 64a and the second lower electrode 70a is electrically connected to the drains of the TFTs. In other words, one of the first electrode 64 and the second electrode 70 comprises an active matrix mode.

It is noted that the first upper electrode 64b and the second upper electrode 70b can be manufactured alone over the upper transparent substrate 54 to serve as a common electrode for the first lower electrode 64a and the second lower electrode 70a. As illustrated above, the gray scale of the pixels can be determined optionally by applying two respective voltages to the first lower electrode 64a and the common electrode, which serves as row and column electrodes respectively herein. Otherwise, the common electrode can be electrically connected to a referenced potential. When the second lower electrode 70a is supplied with another potential, a difference of the potential between the common electrode and the second lower electrode 70a alters alignments of liquid crystal molecules.

In one embodiment of the present invention, the reflective layer 60 is used to reflect and diffuse the incident light entering from the upper transparent substrate 54. In another embodiment, the reflective layer 60 is perforated. The perforated reflective layer 60 not only reflects and diffuses the incident light, but also allows the light emitting from a backlight module on the rear side of the lower transparent substrate 52 to pass through while the incident light is weak. Thus, the brightness of the display is enhanced when the electrical device is used under an environment without sufficient light. In a further embodiment, the thickness of the reflective layer 60 is ranges from 50 to 1000 angstroms to achieve all purposes illustrated herein.

The goal of the present invention is to converge at least two matrix modes within a panel. However, modifications can be made as illustrated below.

EMBODIMENT 2

Figure 4:
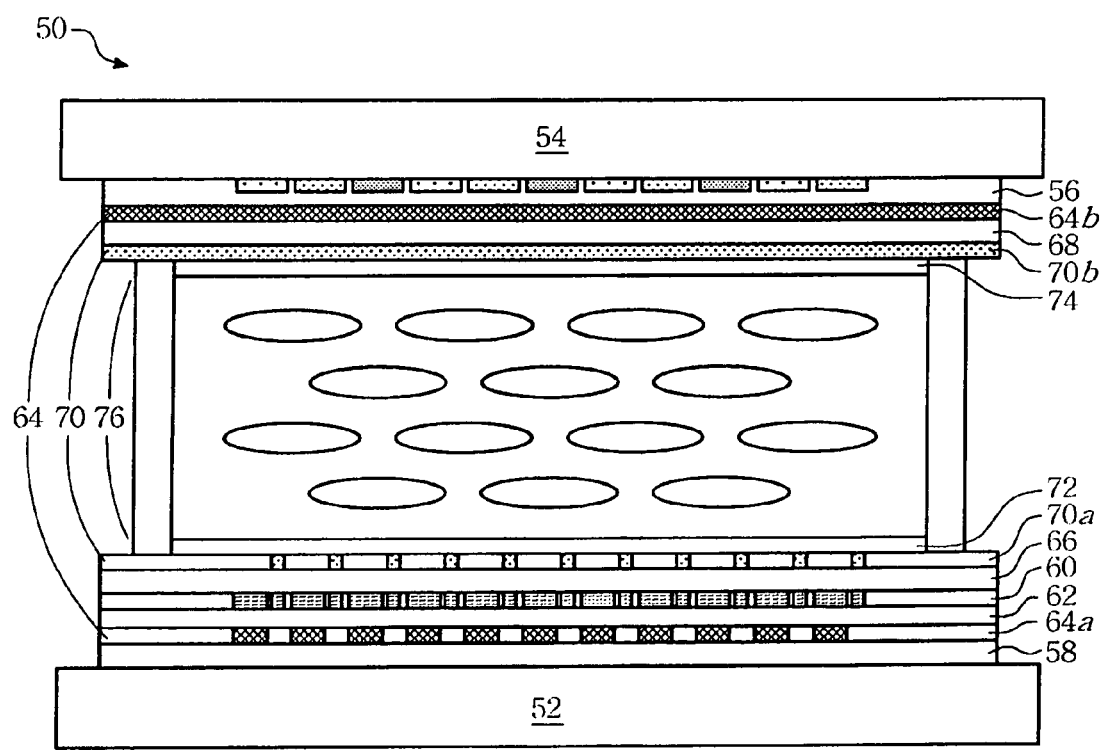
FIG. 4 is a cross-sectional view of the reflection type liquid crystal display having two matrix modes converged within a panel in accordance with the present invention.

Referring to FIG. 4, a modification differing from the Embodiment 1 is to interchange the reflective layer 60 with the first lower electrode 64a.

EMBODIMENT 3

Figure 5:
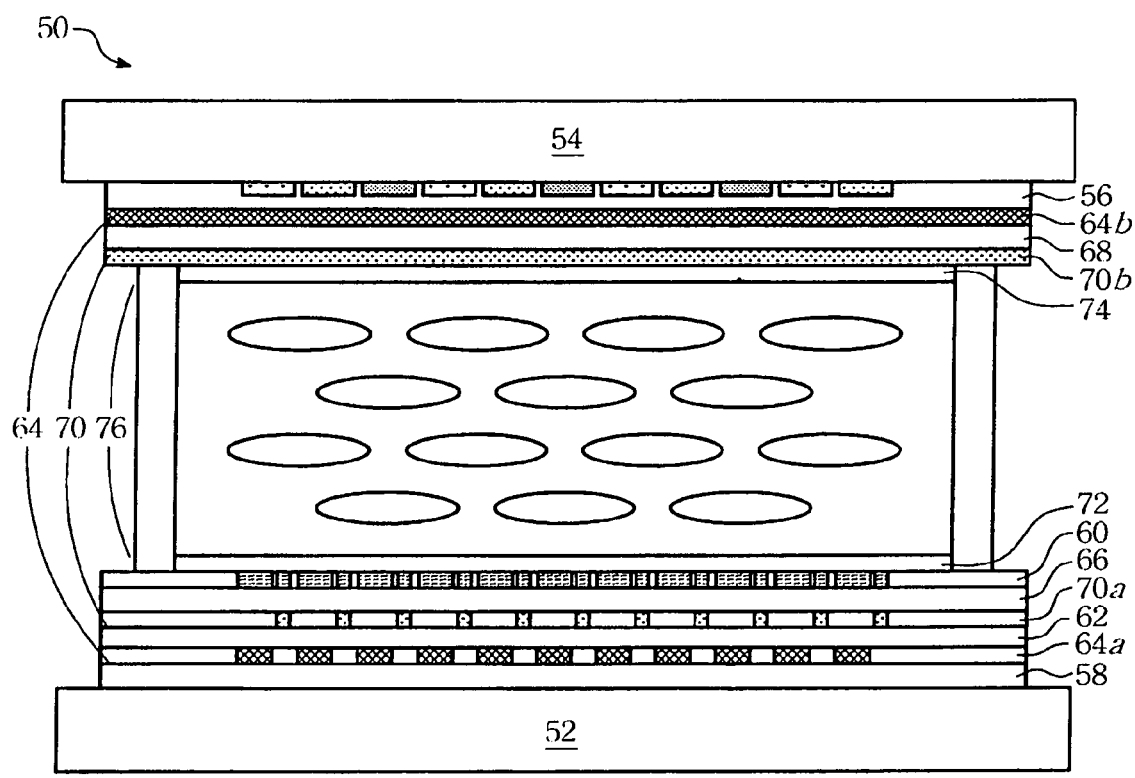
FIG. 5 is a cross-sectional view of the reflection type liquid crystal display having two matrix modes converged within a panel in accordance with the present invention.

Referring to FIG. 5, upon the lower transparent substrate 52 are grown a first transparent insulating layer 58, a first lower electrode 64a, a second transparent insulating layer 62, a second lower electrode 70a, a third transparent insulating layer 66, a reflective layer 60, a first transparent alignment film 72 in turn.

Since two sets of electrodes of the present invention are converged within a panel, the size and the weight of the portable terminal device can be lowered. When the portable terminal device is standby, the passive matrix mode is activated optionally to save electrical consumption; while the portable terminal device is in use, the active matrix mode is activated optionally to obtain a higher resolution. In addition, two sets of electrodes of the present invention are converged within one panel, so that the cost and complexity of the manufacturability can be reduced. Further, the reflective layer of the display can be perforated or ground to allow the light emitting from a backlight module to pass through under the condition of insufficient incident light, thus the drawbacks of using the backlight module or the incident light alone can be avoided.

Various other modifications will be apparent to and can be readily mad by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display panel, comprising:
    a substrate;
    a first set of electrode layers;
    a second set of electrode layers, wherein the first set of electrode layers comprises electrodes supported by the substrate and the second set of electrode layers comprises electrodes supported by the same substrate;
    a thin film transistor, wherein only one of the first and second set of electrode layers is operatively coupled to the thin film transistor to correspond to an active matrix mode, and the other one of the first and second set of electrode layers corresponds to a passive matrix mode, wherein the first set of the electrode layers or the second set of the electrode layers are activated optionally to create images.

2. The liquid crystal display panel as in claim 1, further comprising a liquid crystal layer, wherein the first set of electrode layers comprises a first pair of electrodes operating on the liquid crystal layer, wherein the second set of electrode layers comprises a second pair of electrodes operating on the same liquid crystal layer, and wherein the first pair of the electrodes or the second pair of electrodes are selectively operated to create images with the same liquid crystal layer.

3. The liquid crystal display panel as in claim 2, wherein the first pair of electrodes comprises a first upper electrode and a first lower electrodes, and the second pair of electrodes comprises a second upper electrode and a second lower electrode, wherein at least the first and second upper electrodes or the first and second lower electrodes are stacked in layers on a same side of the liquid crystal layer, without any liquid crystal layer between the stacked layers.

4. The liquid crystal display panel as in claim 2, wherein the first pair of electrodes comprises a first upper electrode and a first lower electrodes, and the second pair of electrodes comprises a second upper electrode and a second lower electrode, wherein at least the first and second upper electrodes or the first and second lower electrodes are staggered on a same side of the liquid crystal layer.

5. The liquid crystal display panel as in claim 2, further comprising a reflective layer formed on one side of the liquid crystal layer to reflect or diffuse ambient light through the liquid crystal layer.

6. The liquid crystal display as in claim 1, wherein the panel further comprising a liquid crystal layer, wherein the first set of electrode layers comprises a first pair of electrodes operating on the liquid crystal layer, wherein the second set of electrode layers comprises a second pair of electrodes operating on the same liquid crystal layer, and wherein the first pair of the electrodes or the second pair of electrodes are selectively operated to create images with the same liquid crystal layer.

7. The liquid crystal display as in claim 6, wherein the first pair of electrodes comprises a first upper electrode and a first lower electrodes, and the second pair of electrodes comprises a second upper electrode and a second lower electrode, wherein at least the first and second upper electrodes or the first and second lower electrodes are stacked in layers on a same side of the liquid crystal layer, without any liquid crystal layer between the stacked layers.

8. The liquid crystal display as in claim 6, wherein the first pair of electrodes comprises a first upper electrode and a first lower electrodes, and the second pair of electrodes comprises a second upper electrode and a second lower electrode, wherein at least the first and second upper electrodes or the first and second lower electrodes are staggered on a same side of the liquid crystal layer.

9. The liquid crystal display as in claim 6, further comprising a reflective layer formed on one side of the liquid crystal layer to reflect or diffuse ambient light through the liquid crystal layer.

10. A liquid crystal display, comprising:
    a panel, comprising:
    a substrate;
    a first set of electrode layers;
    a second set of electrode layers, wherein the first set of electrode layers comprises electrodes supported by the substrate and the second set of electrode layers comprises electrodes supported by the same substrate;

a thin film transistor, wherein only one of the first and second set of electrode layers is operatively coupled to the thin film transistor to correspond to an active matrix mode, and the other one of the first and second set of electrode layers corresponds to a passive matrix mode, wherein the first set of the electrode layers or the second set of the electrode layers are activated optionally to create images.

11. A reflection type liquid crystal display having at least two matrix modes converged within a panel, comprising:

a first substrate;

a second substrate opposite to said first substrate, wherein opposing inner surfaces of said first substrate and said second substrate have a plurality of thin film transistors and a color filter fabricated thereon respectively;

a first insulating layer formed on said first substrate;

a reflective layer formed on said first insulating layer to reflect and diffuse the incident light entering from said second substrate;

a second insulating layer formed on said reflective layer;

a first lower electrode formed on said second insulating layer;

a first upper electrode formed on said color filter;

a third insulating layer formed on said first lower electrode;

a fourth insulating layer formed on said first upper electrode; and a second lower electrode formed on said third insulating layer, wherein only one of the first lower electrode and the second lower electrode is operatively coupled to one of the plurality of thin film transistors to correspond to an active matrix mode, and the other one of the first lower electrode and the second lower electrode corresponds to a passive matrix mode.

12. The reflection type liquid crystal display of claim 11, wherein said first upper electrode is served as a common electrode for said first lower electrode and said second lower electrode.

13. The reflection type liquid crystal display of claim 11, further comprising a second upper electrode located on said fourth insulating layer.

14. The reflection type liquid crystal display of claim 11, wherein said reflective layer is perforated.

15. The reflection type liquid crystal display of claim 11, wherein a thickness of said reflective layer is ranging from 50 to 1000 angstroms.

16. The reflection type liquid crystal display of claim 11, wherein said first lower electrode and said second lower electrode are staggered.

17. The reflection type liquid crystal display of claim 11, wherein said second lower electrode is supplied with a voltage to neutralize a parasitic voltage induced at the time of activating said first lower electrode.

18. The liquid crystal display as in claim 11, further comprising a liquid crystal layer, wherein the first upper electrode is disposed on one side of the liquid crystal layer, and the first lower electrode and second lower electrode are disposed on another side of the liquid crystal layer, wherein the first upper electrode, the first lower electrode and the second lower electrode operate on the same liquid crystal layer, and wherein the first lower electrode or the second lower electrode is selectively operated to create images with the same liquid crystal layer.

19. The liquid crystal display as in claim 18, wherein the first and second lower electrodes are stacked in layers on said another side of the liquid crystal layer, without any liquid crystal layer between the stacked layers.

20. The liquid crystal display as in claim 18, wherein the first and second lower electrodes are staggered on said another side of the liquid crystal layer.

21. A liquid crystal panel, comprising:

a liquid crystal layer, having a first side and a second side;

a first electrode disposed on the first side of the liquid crystal layer, wherein the first electrode corresponds to an active matrix mode;

a second electrode disposed on the same first side of the liquid crystal layer, wherein the second electrode corresponds to a passive matrix mode, and wherein there is no liquid crystal layer between the first and second electrodes;

at least a third electrode disposed on the second side of the liquid crystal layer, wherein the first and second electrode selectively operate with the third electrode, to create images with the same liquid crystal layer.

22. The liquid crystal panel as in claim 21, wherein the first and second electrodes are stacked in layers on the first side of the liquid crystal layer, without any liquid crystal layer between the stacked layers.

23. The liquid crystal panel as in claim 21, wherein the first and second electrodes are staggered on the first side of the liquid crystal layer.

24. The liquid crystal panel as in claim 21, further comprising a reflective layer formed on the first side of the liquid crystal layer to reflect or diffuse ambient light through the liquid crystal layer.

25. The liquid crystal panel as in claim 24, wherein the reflective layer is perforated.

26. A liquid crystal panel comprising:

a liquid crystal layer, having a first side and a second side;

a first electrode disposed on the first side of the liquid crystal layer;

a second electrode disposed on the same first side of the liquid crystal layer;

at least a third electrode disposed on the second side of the liquid crystal layer, a substrate and a thin film transistor disposed on the substrate, wherein only one of the first and second electrodes is operatively coupled to the thin film transistor to correspond to an active matrix mode, and the other one of the first and second electrodes corresponds to a passive matrix mode wherein the first and second electrode selectively operate with the third electrode, to create images with the same liquid crystal layer.

* * * * *